US012738297B2

(12) United States Patent
Fasen et al.

(10) Patent No.: US 12,738,297 B2
(45) Date of Patent: Sep. 15, 2026

(54) ENHANCED DYNAMIC BRAKING ALGORITHM FOR TAPE STORAGE DEVICE

(71) Applicant: INTERNATIONAL BUSINESS MACHINES CORPORATION, Armonk, NY (US)

(72) Inventors: Alexander Donald Fasen, Tucson, AZ (US); Nhan Xuan Bui, Tucson, AZ (US); Randy Clark Inch, Tucson, AZ (US); Scott Jeffrey Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 18/350,008

(22) Filed: Jul. 11, 2023

(65) Prior Publication Data

US 2025/0022484 A1 Jan. 16, 2025

(51) Int. Cl.
*G11B 15/22* (2006.01)
*B65H 18/10* (2006.01)
(Continued)

(52) U.S. Cl.
CPC ........... *G11B 15/22* (2013.01); *B65H 18/103* (2013.01); *B65H 18/12* (2013.01); *B65H 23/18* (2013.01);
(Continued)

(58) Field of Classification Search
CPC .... B65H 18/103; B65H 18/12; B65H 18/145; B65H 18/14; B65H 23/18; B65H 23/1806;
(Continued)

(56) References Cited

U.S. PATENT DOCUMENTS 2,997,246 A 8/1961 Pendleton
3,579,195 A * 5/1971 Hallmark ............... G11B 15/22 711/111

(Continued)

FOREIGN PATENT DOCUMENTS

JP 05182311 A 7/1993

OTHER PUBLICATIONS

JPH05182311A Translation; Kimura T; Tape Traveling Device; Published on: Jul. 23, 1993; Published by: Espacenet (Year: 1993).*

*Primary Examiner* — William D Hutton, Jr.
*Assistant Examiner* — Raveen J Dias
(74) *Attorney, Agent, or Firm* — Kristofer Haggerty

(57) ABSTRACT

According to at least one embodiment, a method, a computer system, and a computer program product for enhanced dynamic braking of a tape storage device during a loss of power is provided. The present invention may include identifying a direction in which tape is moving; identifying a position of the tape; setting brake/coast conditions, wherein the brake/coast conditions comprise a BrakeSelect value of a supply reel and a BrakeSelect value of a take-up reel, based on the identified direction in which the tape is moving and the identified position of the tape; and based upon a detection of a loss of power, applying the set brake/coast conditions to the supply reel and the take-up reel.

17 Claims, 6 Drawing Sheets

(51) Int. Cl.

| | |
|---|---|
| ***B65H 18/12*** | (2006.01) |
| ***B65H 23/00*** | (2006.01) |
| ***B65H 23/18*** | (2006.01) |
| ***B65H 23/185*** | (2006.01) |
| ***B65H 23/198*** | (2006.01) |
| ***B65H 26/08*** | (2006.01) |
| ***G11B 15/18*** | (2006.01) |
| ***G11B 15/20*** | (2006.01) |
| ***G11B 15/32*** | (2006.01) |
| ***G11B 15/44*** | (2006.01) |
| ***G11B 15/48*** | (2006.01) |

(52) U.S. Cl.

CPC ....... *B65H 23/1806* (2013.01); *B65H 23/185* (2013.01); *B65H 23/198* (2013.01); *B65H 26/08* (2013.01); *G11B 15/18* (2013.01); *G11B 15/1883* (2013.01); *G11B 15/1891* (2013.01); *G11B 15/20* (2013.01); *G11B 15/32* (2013.01); *G11B 15/442* (2013.01); *G11B 15/48* (2013.01); *B65H 23/005* (2013.01)

(58) Field of Classification Search

CPC .............. B65H 23/1813; B65H 23/182; B65H 23/1825; B65H 23/185; B65H 23/195; B65H 23/1955; B65H 23/198; B65H 26/00; B65H 26/02; B65H 26/08; B65H 23/005; B65H 2701/378; B65H 2801/91; B65H 10/12; G11B 15/00; G11B 15/005; G11B 15/18; G11B 15/1808; G11B 15/1883; G11B 15/1891; G11B 15/20; G11B 15/22; G11B 15/32; G11B 15/40; G11B 15/43; G11B 15/44; G11B 15/442; G11B 15/444; G11B 15/446; G11B 15/448

See application file for complete search history.

(56) References Cited

U.S. PATENT DOCUMENTS

| | | | | |
|---|---|---|---|---|
| 3,648,134 | A | 3/1972 | Audeh | |
| 3,713,606 | A | 1/1973 | Van Pelt | |
| 3,737,751 | A | 6/1973 | Lima | |
| 3,809,328 | A * | 5/1974 | Cope | G11B 15/58 242/331.2 |
| 3,809,329 | A | 5/1974 | Jenkins | |
| 3,873,896 | A | 3/1975 | Jennings | |
| 3,889,289 | A * | 6/1975 | Kubach | G11B 15/18 360/39 |
| 3,895,277 | A | 7/1975 | Klumpp | |
| 3,906,299 | A | 9/1975 | Mittelstaedt | |
| 3,916,441 | A * | 10/1975 | Jones | G11B 15/44 360/71 |
| 4,065,074 | A * | 12/1977 | Anderson | G11B 15/48 242/331.3 |
| 4,085,354 | A | 4/1978 | Harshberger, Jr. | |
| 4,223,855 | A | 9/1980 | Briedis | |
| 4,466,512 | A * | 8/1984 | Witt | F16D 59/00 188/77 R |
| 4,481,449 | A | 11/1984 | Rodal | |
| 4,542,864 | A | 9/1985 | Hart | |
| 4,625,930 | A * | 12/1986 | Urlik | G03B 21/43 242/356.5 |
| 4,767,970 | A | 8/1988 | Rodal | |
| 4,801,853 | A * | 1/1989 | Lewis | G11B 15/50 318/7 |
| 5,426,355 | A * | 6/1995 | Zweighaft | G11B 15/026 360/71 |
| 6,078,156 | A * | 6/2000 | Spurr | H02P 3/08 318/368 |
| 6,305,628 | B1 | 10/2001 | Thompson | |
| 6,819,065 | B1 | 11/2004 | Howarth | |
| 11,978,479 | B2 * | 5/2024 | Schreck | G11B 5/00813 |
| 2002/0030919 | A1 * | 3/2002 | Higuchi | G11B 15/22 |
| 2008/0180828 | A1 * | 7/2008 | Bates | G11B 15/48 318/362 |
| 2013/0028647 | A1 * | 1/2013 | Okada | B65H 23/182 400/583 |
| 2019/0389683 | A1 * | 12/2019 | Tachi | B65H 23/066 |

* cited by examiner

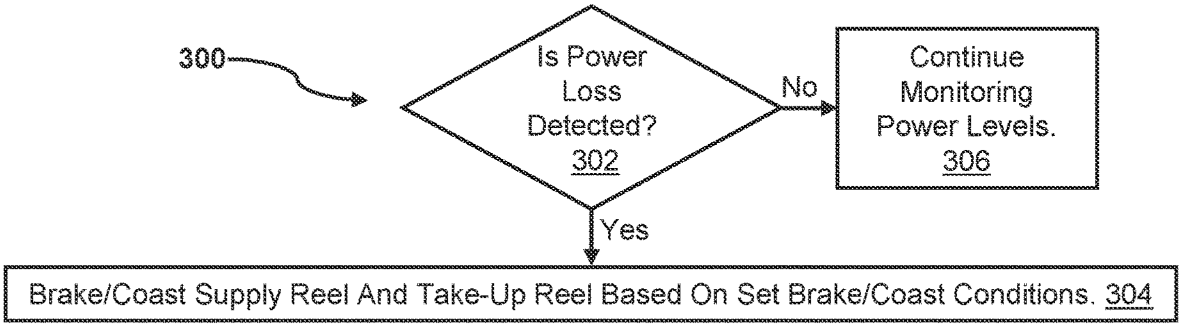

FIGURE 3

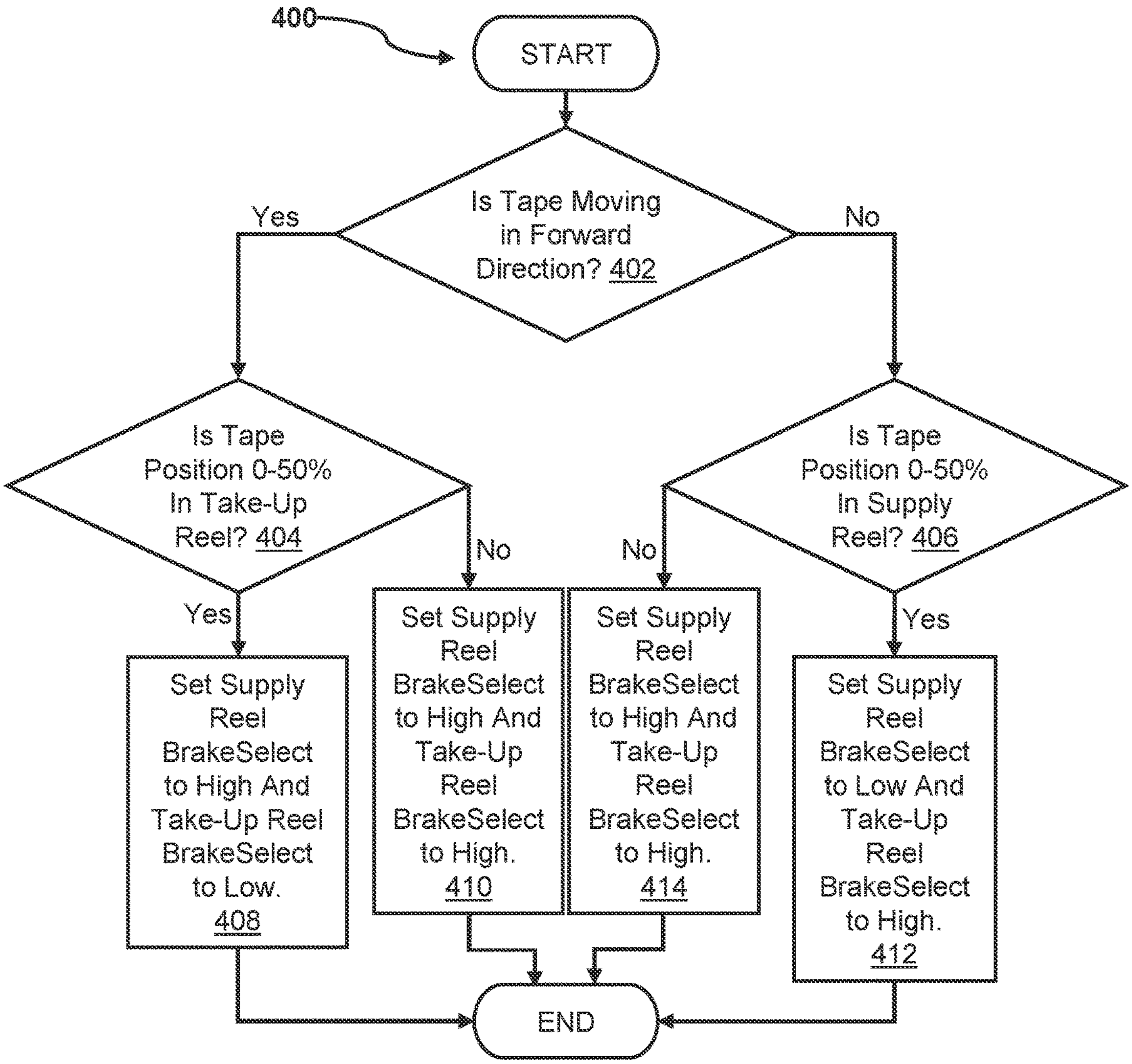

START

Is Tape Moving in Forward Direction? 402

Yes

No

Is Tape Position 0-50% In Take-Up Reel? 404

Is Tape Position 0-50% In Supply Reel? 406

Yes

No

No

Yes

Set Supply Reel BrakeSelect to High And Take-Up Reel BrakeSelect to Low. 408

Set Supply Reel BrakeSelect to High And Take-Up Reel BrakeSelect to High. 410

Set Supply Reel BrakeSelect to High And Take-Up Reel BrakeSelect to High. 414

Set Supply Reel BrakeSelect to Low And Take-Up Reel BrakeSelect to High. 412

END 212
208
504
210
EMPTY
FULL 212
208
506
210
<1/2 FULL
>1/2 FULL 212
208
508
210
>1/2 FULL
<1/2 FULL 212
208
210
EMPTY
510
FULL

| | TAPE LOCATION | |
|---|---|---|
| FORWARD | 0 - 50% (TAKE-UP REEL) | >50 - 100% (TAKE-UP REEL) |
| SUPPLY REEL | BRAKE | BRAKE |
| TAKE-UP REEL | COAST | BRAKE |

FIGURE 6

| | TAPE LOCATION | |
|---|---|---|
| REVERSE | 0 - 50% (SUPPLY REEL) | >50 - 100% (SUPPLY REEL) |
| SUPPLY REEL | COAST | BRAKE |
| TAKE-UP REEL | BRAKE | BRAKE |

FIGURE 7

ENHANCED DYNAMIC BRAKING ALGORITHM FOR TAPE STORAGE DEVICE

BACKGROUND

The present invention relates generally to the field of tape storage devices and, in particular, to controlling the braking of a tape storage device, specifically a reel-to-reel tape drive, in the event of a loss of power.

Tape storage devices are used to store computer data on magnetic tape. Tape storage devices can back up and restore data, and archive and retrieve files. Thus, the data comprised on a tape storage device may likely be very important. Currently, in the event of a loss of power, tape storage devices may undergo graceful dynamic braking, in which the trailing reel applies braking force and the leading reel coasts. However, tape damage can still occur during a high-tension tape scenario.

SUMMARY

Embodiments of a method, a computer system, and a computer program product for enhanced dynamic braking of a tape storage device are described. According to one embodiment of the present invention, a method, computer system, and computer program product for enhanced dynamic braking for a tape storage device during a loss of power is provided. The present invention may include identifying a direction in which tape is moving. The present invention may include identifying a position of the tape. The present invention may include setting brake/coast conditions based on the identified direction in which the tape is moving and the identified position of the tape. The setup conditions may comprise a value of a supply reel and a value of a take-up reel. The present invention may include based upon a detection of a loss of power, applying the set brake/coast conditions to the supply reel and the take-up reel. A permissive embodiment of the present invention may include applying brake to the supply reel and applying coast to the take-up reel, in response to identifying the tape is moving in a forward direction and identifying the position of the tape being in a range of 0 through 50% in the take-up reel. A permissive embodiment of the present invention may include applying brake to the supply reel and applying brake to the take-up reel, in response to identifying the tape is moving in a forward direction and identifying the position of the tape being in a range greater than 50% in the take-up reel. A permissive embodiment of the invention may include applying coast to the supply reel and applying brake to the take-up reel, in response to identifying the tape is moving in a reverse direction and identifying the position of the tape being in a range of 0 through 50% in the supply reel. A permissive embodiment of the invention may include applying brake to the supply reel and applying brake to the take-up reel, in response to identifying the tape is moving in a reverse direction and identifying the position of the tape being in a range greater than 50% in the supply reel. A permissive embodiment of the invention may include the brake/coast conditions being set dynamically based on both the direction in which the tape is moving, and the position of the tape being identified dynamically during operation of the tape storage device. A permissive embodiment of the invention may include the value of the supply reel and the value of the take-up reel being both set to high, set to high and low, or set to low and high.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is an operational flowchart illustrating a tape storage device power loss enhanced dynamic braking process according to at least one embodiment;

FIG. 4 is an operational flowchart illustrating an enhanced dynamic braking brake/coast conditions setup process according to at least one embodiment;

FIG. 6 depicts a table of a forward power loss enhanced dynamic braking scheme according to at least one embodiment;

FIG. 7 depicts a table of a reverse power loss enhanced dynamic braking scheme according to at least one embodiment.

DETAILED DESCRIPTION

Figure 1:
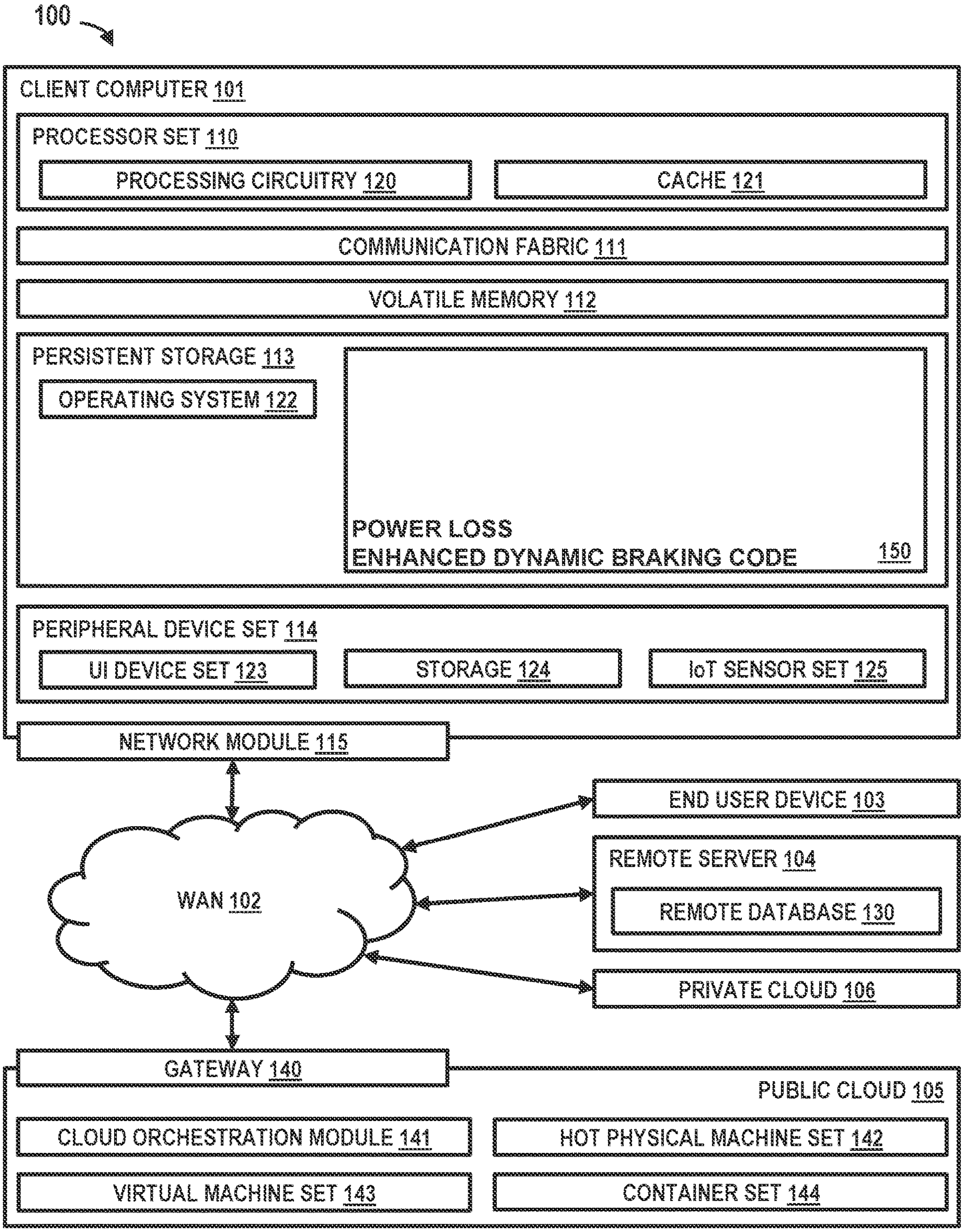
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Tape reel drive systems read and write data on magnetic tape. Additionally, tape reel drive systems are used to preserve and protect data. Tape reels may often move at a high speed, such as during data transfer, read and write operations, or during a rewind. While moving at a high speed, a scenario in which the tape reel drive system experiences a loss of power can cause devastating results. This is because a loss of power can cause high tape tension to develop and loose tape in the tape path, both of which increase the likelihood of physical tape damage during the deceleration or stopping of the tape. Physical damage to the tape can result in the loss of data written on the tape. To further improve the safety of data written on tape reel drive systems, there is a need to apply a power loss braking scheme(s) is applied to a tape storage device to safely slow down the tape storage device in the event of a power loss.

Currently, the existing methods attempt to safely slow down tape storage devices during a loss of power with various methods. One way in which current methods attempt to address problems with braking a tape storage device is by applying graceful dynamic braking ("GDB"). GDB is where the trailing reel of a tape storage device applies braking force and the leading reel of the tape storage device coasts. However, the GDB braking scheme can cause tape damage when the trailing reel's radius is small and its velocity is high in comparison to the leading reel's velocity, for example, when a back electromotive force ("EMF") produces a strong braking force, and the massive leading reel continues to coast, thus pulling tape against the braking force. Additionally, the concept of braking only the trailing reel has the consequence of taking a long time to slow both the leading reel and the trailing reel down to a stop. Another way in current methods attempt to safely slow down tape storage devices during a loss of power is by providing power for a control circuit using a backup power supply. However, it may be likely that a loss of power results in the backup power supply losing power in addition to the main power supply. Therefore, shortcomings remain with safely slowing down tape storage devices.

It is important that a braking scheme that can control the deceleration of a tape during all velocities of the tape reels be applied to a tape reel drive system without requiring power. Thus, an improvement in brake devices in a tape reel drive system has the potential to benefit tape drive systems by providing the ability for enhanced dynamic braking of a tape storage device at all velocities of the tape reels in the event power is lost.

Embodiments of the present invention can remedy the above-mentioned deficiencies in the prior art by applying a brake/coast enhanced dynamic braking scheme, a coast/brake enhanced dynamic braking scheme, or a brake/brake enhanced dynamic braking scheme, to a tape reel during a loss of power. The present invention can apply a brake to both the supply reel and the take-up reel of a tape reel when the difference in velocities in the inboard and outboard reels is sufficiently high, during a loss of power. Furthermore, the present invention can mitigate the maximum tension applied to a tape reel while power loss braking and additionally can maintain a short braking distance. Additionally, the present invention can maintain the production of positive tension during power loss braking while also keeping the produced maximum tension below a level that would risk damaging the tape.

Embodiments of the present invention have the capacity to improve braking in a tape reel drive system by providing a processor-implemented method, a computer system, and a computer program product for enhanced dynamic braking of a tape reel in the event of a loss of power. Specifically, the present invention can apply various enhanced dynamic braking schemes, depending on the direction of the tape and the position of the tape at the moment a loss of power is detected, to a supply reel and a take-up reel of a tape storage device.

According to at least one embodiment, the present invention can identify a direction in which tape is moving, identify a position of the tape, set brake/coast conditions, wherein the brake/coast conditions comprise a value of a supply reel and a value of a take-up reel, based on the identified direction in which the tape is moving and the identified position of the tape; and based upon a detection of a loss of power, apply the set brake/coast conditions to the supply reel and the take-up reel. An embodiment has the advantage of improved slowdown of a tape reel, thereby reducing the risk of damage to the tape.

An embodiment in which the applying of the set brake/coast conditions to the supply reel and the take-up reel comprises applying brake to the supply reel and applying coast to the take-up reel, in response to identifying the tape is moving in a forward direction and identifying the position of the tape being in a range of 0 through 50% in the take-up reel, has the advantage of quickly and safely slowing down a tape during tape movement in the forward direction while maintaining tape tension and where the majority of the tape is positioned at the beginning of the tape.

An embodiment in which the applying of the set brake/coast conditions to the supply reel and the take-up reel comprises applying brake to the supply reel and applying brake to the take-up reel, in response to identifying the tape is moving in a forward direction and identifying the position of the tape being in a range greater than 50% in the take-up reel, has the advantage of quickly and safely slowing down a tape during tape movement in the forward direction while maintaining tape tension and where the majority of the tape is positioned at the end of the tape.

An embodiment in which the applying of the set brake/coast conditions to the supply reel and the take-up reel comprises applying coast to the supply reel and applying brake to the take-up reel, in response to identifying the tape is moving in a reverse direction and identifying the position of the tape being in a range of 0 through 50% in the supply reel, has the advantage of quickly and safely slowing down a tape during tape movement in the reverse direction while maintaining tape tension and where the majority of the tape is positioned at the end of the tape.

An embodiment in which the applying of the set brake/coast conditions to the supply reel and the take-up reel comprises applying brake to the supply reel and applying brake to the take-up reel, in response to identifying the tape is moving in a reverse direction and identifying the position of the tape being in a range greater than 50% in the supply reel, has the advantage of quickly and safely slowing down a tape during tape movement in the reverse direction while maintaining tape tension and where the majority of the tape is positioned at the beginning of the tape.

An embodiment in which the brake/coast conditions are set dynamically based on both the direction in which the tape is moving, and the position of the tape being identified dynamically during operation of the tape storage device, may be useful for ensuring the brake/coast conditions are always set based on the most current direction and position of the tape during operation of the tape.

An embodiment in which the value of the supply reel and the value of the take-up reel can both be set to high, set to high and low, or set to low and high, may be useful for ensuring the enhanced dynamic braking can be applied accurately to the supply reel and the take-up for tape direction and tape position.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for enhanced dynamic braking of a tape storage device during a loss of power, comprising identifying a direction in which tape is moving, identifying a position of the tape, setting brake/coast conditions, wherein the brake/coast conditions comprise a value of a supply reel and a value of a take-up reel, based on the identified direction in which the tape is moving and the identified position of the tape; and based upon a detection of a loss of power, applying the set brake/coast conditions to the supply reel and the take-up reel.

Beginning now with FIG. 1, an exemplary networked computer environment 100 is depicted, according to at least one embodiment. Computing environment 100 contains an example of an environment for the execution of at least some of the computer code involved in performing the inventive methods, such as power loss enhanced dynamic braking code 150. In addition to code block 150 computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer, or any other form of computer or mobile device now known or to be developed in the future that is capable of running an algorithm, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
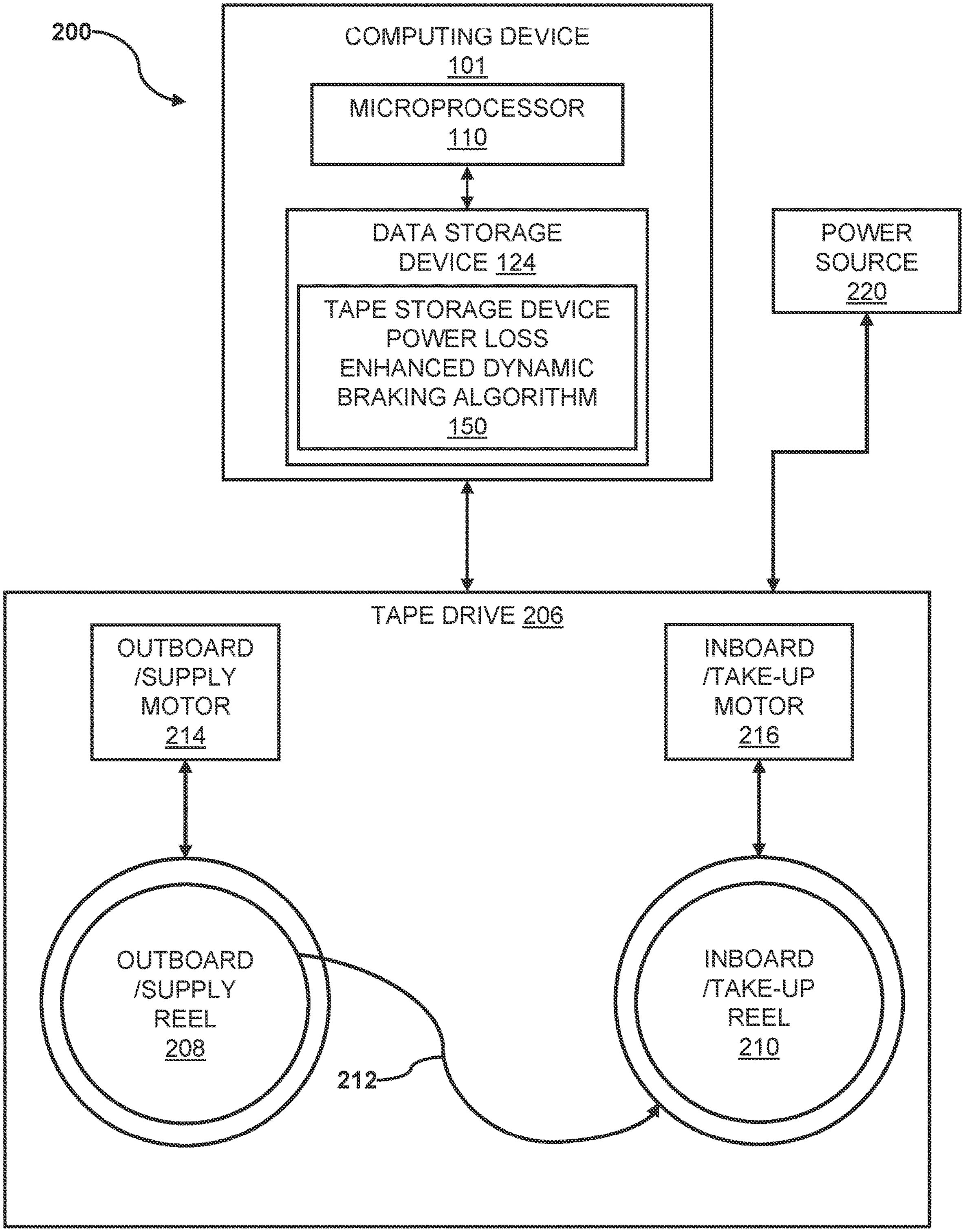
FIG. 2 depicts a block diagram of the components of a tape reel drive system according to at least one embodiment.

Referring to FIG. 2, a high-level partial block diagram of the components of a tape reel drive system 200, is depicted, according to at least one embodiment. FIG. 2 may include client computing device 101 and a tape drive 206 interconnected via a communication network 102, and a power source 220. It should be understood that additional system architecture directed to certain aspects of the operation that are not required for an understanding of the present invention, such as power boundaries, sensors, amplifiers, capstan, controllers, pinch roller(s), tachometers, guides, tape formatting, read/write functions, etc., has not been depicted for ease of illustration. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run a tape storage device power loss enhanced dynamic braking algorithm 150 and communicate with the tape drive 206 via the communication network 102, in accordance with one embodiment of the invention.

Tape drive 206 may comprise an outboard reel 208, alternatively referred to as a supply reel, an inboard reel 210, alternatively referred to as a take-up reel, tape 212, an outboard motor 214, alternatively referred to as a supply motor, and an inboard motor 216, alternatively referred to as a take-up motor. The term "inboard reel" or "take-up reel" refers to the reel receiving tape 212 in the forward direction and feeding tape 212 in the reverse direction. The term "outboard reel" or "supply reel" refers to the reel feeding tape 212 in the forward direction and receiving tape 212 in the reverse direction. The term "outboard motor" or "supply motor" refers to the motor operatively coupled to the outboard/supply reel 208. The term "inboard motor" or "take-up motor" refers to the motor operatively coupled to the inboard/take-up reel 210. The motors 214, 216 can be operatively coupled to reels 208, 210, and can pull the tape 212 across a tape head, not explicitly shown. Additionally, the motors, 214, 216 can move the tape 212 from one reel to the other reel in a forward direction and a reverse direction. Tape operations can occur with the tape 212 moving in either direction. Furthermore, reels 208, 210 may be referred to as the leading reel and the trailing reel, respectively. The term "leading reel" refers to the reel receiving tape 212 and the term "trailing reel" refers to the reel feeding tape 212. Furthermore, the phrase "located at the beginning of the tape" refers to the volume of tape 212 wrapped around the supply reel 208, and the phrase "located at the end of the tape" refers to the volume of tape 212 wrapped around the take-up reel 210.

According to the present embodiment, the tape reel drive system 200, "the system", may be a system capable of upon detection of a power loss, braking a supply reel 208 and braking a take-up reel 210 when the value of the supply reel is set to high and the value of the take-up reel is set to high; braking a supply reel 208 and coasting a take-up reel 210 when the value of the supply reel is set to high and the value of the take-up reel is set to low; and coasting a supply reel 208 and braking a take-up reel 210 when the value of the supply reel is set to low and the value of the take-up reel is set to high. The algorithm 150 is explained in further detail below with respect to FIG. 3.

Referring now to FIG. 3, an operational flowchart illustrating a tape storage device power loss enhanced dynamic braking process 300 is depicted according to at least one embodiment. At 302, the system 200 detects whether there is a loss of power. According to one implementation, in response to detecting that there is a loss of power (step 302, "YES" branch), the system 200 may continue to step 304 to apply brake/coast to the supply reel 208 and to the take-up reel 210 based on the brake/coast conditions set by the algorithm 150. The system 200 may monitor both +5 v and +12 v power supplies, not explicitly shown. The system 200 can detect a loss of power if any of the power supply levels drop by 10% or more. The tape reel drive system 200 can comprise various sensors, not explicitly shown, that can detect when the provided power is below the stated threshold. Upon a loss of power, the system 200 can trigger a power loss flag and a Reset register value can default too high. If no loss of power is currently detected (step 302, "NO" branch), the system 200 may continue to step 306 to continue monitoring the power levels.

At 304, upon the detection of a loss of power, the system 200 brakes/coasts the supply reel 208 and the take-up reel 210 in accordance with the values of the brake/coast conditions set by the algorithm 150, at the moment the detection of the loss of power occurred. Specifically, the system 200 can execute the behaviors corresponding to the values set by the algorithm 150, by braking or coasting the supply motor 214 and the take-up motor 216 in order to brake/coast the supply reel 208 and the take-up reel 210. Coast/brake conditions can comprise a supply reel register value and a take-up reel register value. register values can be set pursuant to the value regions from the forward power loss enhanced dynamic braking control scheme, as depicted in FIG. 6, or the reverse power loss enhanced dynamic braking control scheme, as depicted in FIG. 7. The value regions can be set by the algorithm 150 during normal operation of the tape storage device depending on the direction of the tape 212 and the location of the tape 212. The algorithm 150 can determine the current tape 212 location and the direction of the tape 212 to identify whether to set a forward power loss enhanced dynamic braking control scheme or a reverse power loss enhanced dynamic braking control scheme and more specifically, whether to set brake/brake register values, coast/brake register values, or brake/coast register values. The algorithm 150 can set register values as high or low in very high-speed integrated circuit hardware description language ("VHDL") using a Verdin module. A high register value can correspond to 1 and a low value can correspond to 0. A high register value can represent brake and a low register value can represent coast. Thus, the algorithm 150 selection of the two values may comprise a combination of high and high, high and low, or low and high. The terms "high" and "low" are used to illustrate the two states of the digital signals transmitted to the tape drive 206; it may be appreciated that the actual states may be different. The enhanced dynamic braking brake/coast conditions setup process is explained in further detail below in FIG. 4.

In response to the take-up reel register value being set to low and the supply reel register value being set to high by the algorithm 150, the system 200 may coast the take-up reel 210 and brake the supply reel 208. In response to the take-up reel register value being set to high and the supply reel register value being set to low by the algorithm 150, the system 200 may brake the take-up reel 210 and coast the supply reel 208. In response to the take-up reel register value being set to high and the supply reel register value being set to high by the algorithm 150, the system 200 may brake the take-up reel 210 and brake the supply reel 208.

At 306, the system 200 continues to monitor the power levels to detect if a loss of power occurs.

According to the present embodiment, power loss enhanced dynamic braking code 150, "the algorithm", may be an algorithm capable of setting the value of the supply reel to high and the value of the take-up reel to low, based on both identifying the tape 212 as moving forward and the position of the tape 212 as being 0 through 50% in the take-up reel 210; setting the value of the supply reel to high and the value of the take-up reel to high, based on both identifying the tape 212 as moving forward and the position of the tape 212 as being greater than 50% in the take-up reel 210; setting the value of the supply reel to low and the value of the take-up reel to high, based on both identifying the tape 212 as moving in reverse and the position of the tape 212 as being 0 through 50% in the supply reel 208; and setting the value of the supply reel to high and the value of the take-up reel to high, based on both identifying the tape 212 as moving in reverse and the position of the tape 212 as being greater than 50% in the supply reel 208. The algorithm 150 may be located on client computing device 101 or remote server 104 or on any other device located within network 102. Furthermore, the algorithm 150 may be distributed in its operation over multiple devices, such as client computer device 101 and remote server 104. The algorithm 150 is explained in further detail below with respect to FIG. 4.

FIG. 4 is an operational flowchart 400 illustrating an enhanced dynamic braking brake/coast conditions setup process according to at least one embodiment. At 402, the algorithm 150 determines whether the tape 212 is moving in a forward direction. According to one implementation, in response to determining that the tape 212 is moving in a forward direction (step 402, "YES" branch), the algorithm 150 may continue to step 404 to determine whether the tape 212 position is 0 through 50% in the take-up reel 210. The algorithm 150 may determine that the tape 212 is moving in the forward direction by detecting an increasing volume of tape 212 in the take-up reel 210. In response to determining that the tape 212 is moving in the reverse direction (step 402, "NO" branch), the algorithm 150 may continue to step 406 to determine whether the tape 212 position is 0 through 50% in the supply reel 208. The algorithm 150 may determine that the tape 212 is moving in the reverse direction by detecting an increasing volume of tape 212 in the supply reel 208.

At 404, the algorithm 150 determines whether the tape 212 position is 0 through 50% in the take-up reel 210. According to one implementation, in response to determining that 0 through 50% of the tape 212 is located in the take-up reel 210 (step 404, "YES" branch), the algorithm 150 may continue to step 408 to set the supply reel value to high and the take-up reel value to low. The algorithm 150 may determine that 0 through 50% of the tape 212 is located in the take-up reel 210 based on the measured volume of tape 212 in the supply reel 208 and the measured volume of tape 212 in the take-up reel 210. In response to determining that greater than 50% of the tape 212 is located in the take-up reel 210 (step 404, "NO" branch), the algorithm 150 may continue to step 410 to set the supply reel value to high and the take-up reel value to high.

At 406, the algorithm 150 determines whether the tape 212 position is 0 through 50% in the supply reel 208. According to one implementation, in response to determining that 0 through 50% of the tape 212 is located in the supply reel 208 (step 406, "YES" branch), the algorithm 150 may continue to step 412 to set the supply reel value to low and the take-up reel value to high. The algorithm 150 may determine that 0 through 50% of the tape 212 is located in the supply reel 208 based on the measured volume of tape 212 in the supply reel 208 and the measured volume of tape 212 in the take-up reel 210. In response to determining that greater than 50% of the tape 212 is located in the supply reel 208 (step 406, "NO" branch), the algorithm 150 may continue to step 414 to set the supply reel value to high and the take-up reel value to high.

At 408, the algorithm 150 sets the supply reel value to high and the take-up reel value to low. As previously stated, a high register value can represent brake and a low register value can represent coast.

At 410, the algorithm 150 sets the supply reel value to high and the take-up reel value to high.

At 412, the algorithm 150 sets the supply reel value to low and the take-up reel value to high.

At 414, the algorithm 150 sets the supply reel value to high and the take-up reel value to high.

Figure 5:
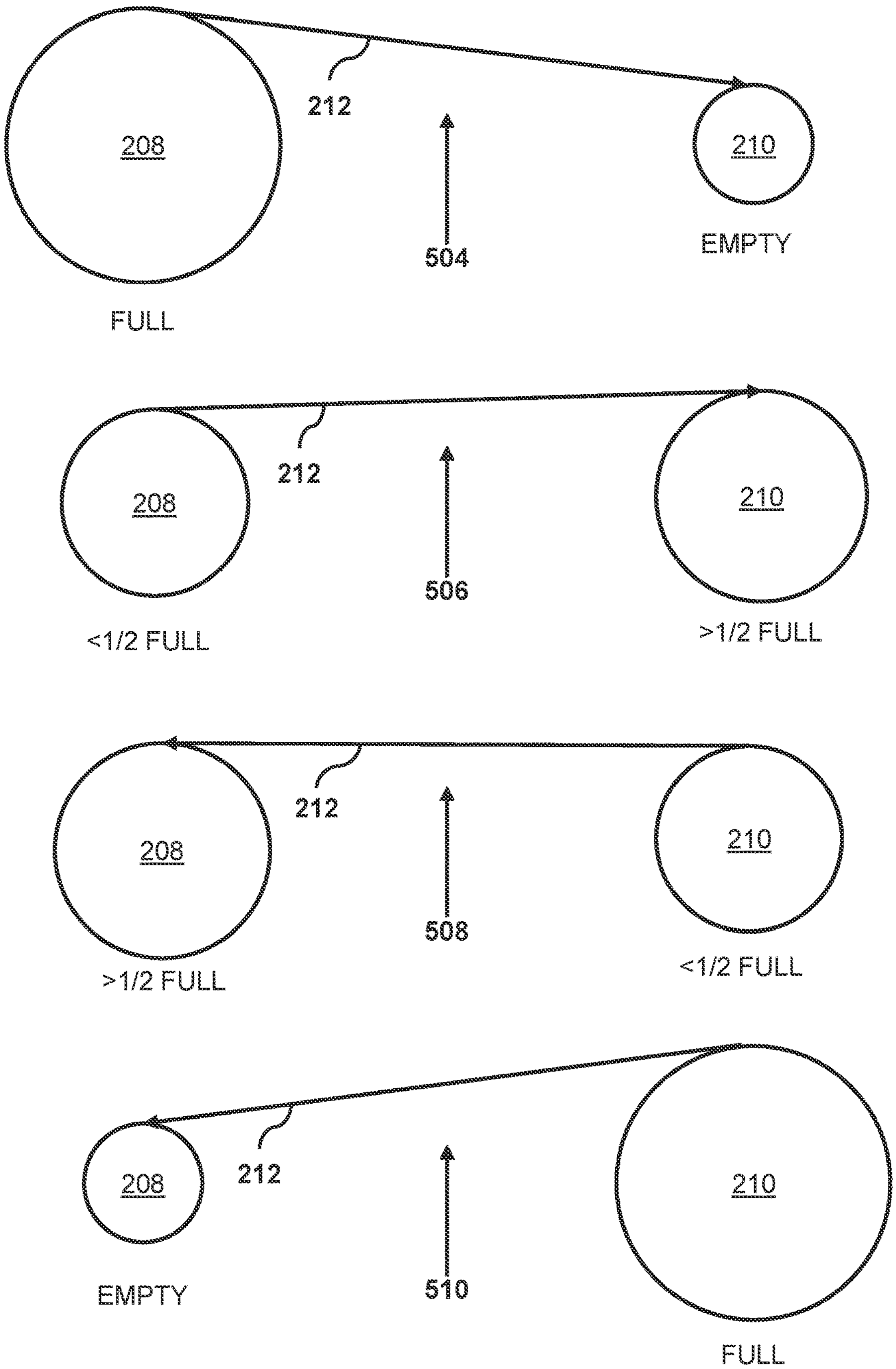
FIG. 5 depicts various tape profiles according to at least one embodiment.

Referring to FIG. 5, various tape volumes for the four initial tape profiles programmed into the microprocessor 110 are depicted according to at least one embodiment. The first initial tape profile 504 depicts tape 212 movement in a forward direction and the supply reel 208 as substantially full, ~100% full, and the take-up reel 210 as substantially empty, ~0% full. The second initial tape profile 506 depicts tape 212 movement in a forward direction and the supply reel 208 as less than 50% full and the take-up reel 210 as greater than 50% full. The third initial tape profile 508 depicts tape 212 movement in the reverse direction and the take-up reel 210 as less than 50% full and the supply reel 208 as greater than 50% full. The fourth initial tape profile 510 depicts tape 212 movement in the reverse direction and the take-up reel 210 as substantially full, ~100% full, and the supply reel 208 as substantially empty, ~0% full. As previously noted, each tape profile has an associated tape tension which should be substantially maintained throughout the enhanced dynamic braking power loss process in order to prevent tape damage. The number of tape profiles provides a satisfactory compromise of the competing factors, but the scope of the present invention is not limited to any specific tape profile or number of tape profiles. Thus, a greater number of initial tape profiles may be programmed into the microprocessor 110 to provide a greater degree of accuracy.

Figure 8:
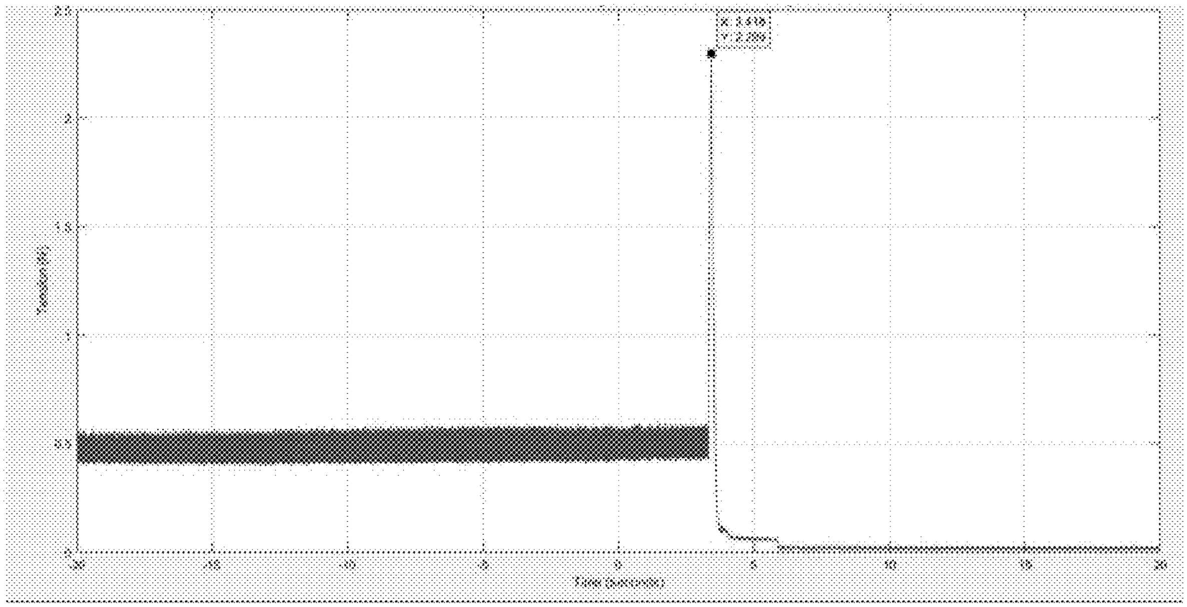
FIG. 8 depicts a graph of the measured tension experienced during the power loss enhanced dynamic braking schemes occurring during the application of brake to both a supply reel and a take-up reel, according to at least one embodiment.

Referring now to FIG. 8, a graph of the measured tension experienced during the application of the power loss braking schemes occurring when the measured difference in velocities in the supply 208 and take-up 210 reels is sufficiently high, is depicted according to at least one embodiment. The power loss braking scheme in which a tape 212 is moving in a forward direction and greater than 50% of the tape 212 is located in the take-up reel 210, according to FIG. 6, and a power loss braking scheme in which a tape 212 is moving in a reverse direction and greater than 50% of the tape 212 is located in the supply reel 208, according to FIG. 7, are depicted, according to at least one embodiment. The asymmetry of the depicted regions can compensate for the difference in mass between the take-up reel 210 and the supply reel 208 due to the leader block assembly as well as structural reinforcement. The brief tension spike experienced during enhanced dynamic braking can fall outside of a normal tape operating spec, however, the power loss braking falls outside of normal drive operation.

It may be appreciated that FIGS. 2 through 8 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for braking of a tape storage device during a loss of power, the method comprising:

identifying a direction in which a tape is moving;

identifying a position of the tape;

setting brake/coast conditions, wherein the brake/coast conditions comprise a register value of a supply reel and a register value of a take-up reel, based on the identified direction in which the tape is moving and the identified position of the tape; and based upon a detection of a loss of power, applying the set brake/coast conditions to the supply reel and the take-up reel, wherein the applying of the set brake/coast conditions to the supply reel and the take-up reel comprises applying brake to the supply reel and applying brake to the take-up reel, in response to identifying the tape is moving in a forward direction and identifying the position of the tape being in a range greater than 50% in the take-up reel.

2. The method of claim 1, wherein the applying of the set brake/coast conditions to the supply reel and the take-up reel comprises applying brake to the supply reel and applying coast to the take-up reel, in response to identifying the tape is moving in the forward direction and identifying the position of the tape being in a range of 0 through 50% in the take-up reel.

3. The method of claim 1, wherein the applying of the set brake/coast conditions to the supply reel and the take-up reel comprises applying coast to the supply reel and applying brake to the take-up reel, in response to identifying the tape is moving in a reverse direction and identifying the position of the tape being in a range of 0 through 50% in the supply reel.

4. The method of claim 1, wherein the applying of the set brake/coast conditions to the supply reel and the take-up reel comprises applying brake to the supply reel and applying brake to the take-up reel, in response to identifying the tape is moving in a reverse direction and identifying the position of the tape being in a range greater than 50% in the supply reel.

5. The method of claim 1, wherein the brake/coast conditions are set dynamically based on both the direction in which the tape is moving, and the position of the tape being identified dynamically during operation of the tape storage device.

6. The method of claim 1, wherein the register value of the supply reel and the register value of the take-up reel can both be set to high, set to high and low, or set to low and high.

7. A computer system for braking of a tape storage device during a loss of power, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

identifying a direction in which a tape is moving;

identifying a position of the tape;

setting brake/coast conditions, wherein the brake/coast conditions comprise a register value of a supply reel and a register value of a take-up reel, based on the identified direction in which the tape is moving and the identified position of the tape; and based upon a detection of a loss of power, applying the set brake/coast conditions to the supply reel and the take-up reel, wherein the applying of the set brake/coast conditions to the supply reel and the take-up reel comprises applying brake to the supply reel and applying brake to the take-up reel, in response to identifying the tape is moving in a forward direction and identifying the position of the tape being in a range greater than 50% in the take-up reel.

8. The computer system of claim 7, wherein the applying of the set brake/coast conditions to the supply reel and the take-up reel comprises applying brake to the supply reel and applying coast to the take-up reel, in response to identifying the tape is moving in the forward direction and identifying the position of the tape being in a range of 0 through 50% in the take-up reel.

9. The computer system of claim 7, wherein the applying of the set brake/coast conditions to the supply reel and the take-up reel comprises applying coast to the supply reel and applying brake to the take-up reel, in response to identifying the tape is moving in a reverse direction and identifying the position of the tape being in a range of 0 through 50% in the supply reel.

10. The computer system of claim 7, wherein the applying of the set brake/coast conditions to the supply reel and the take-up reel comprises applying brake to the supply reel and applying brake to the take-up reel, in response to identifying the tape is moving in a reverse direction and identifying the position of the tape being in a range greater than 50% in the supply reel.

11. The computer system of claim 7, wherein the brake/coast conditions are set dynamically based on both the direction in which the tape is moving, and the position of the tape being identified dynamically during operation of the tape storage device.

12. The computer system of claim 7, wherein the register value of the supply reel and the register value of the take-up reel can both be set to high, set to high and low, or set to low and high.

13. A computer program product for braking of a tape storage device during a loss of power, the computer program product comprising:

one or more computer-readable tangible storage medium and program instructions stored on at least one of the one or more computer-readable tangible storage medium, the program instructions executable by a processor to cause the processor to perform a method comprising:

identifying a direction in which a tape is moving;

identifying a position of the tape;

setting brake/coast conditions, wherein the brake/coast conditions comprise a a register value of a supply reel and a register value of a take-up reel, based on the identified direction in which the tape is moving and the identified position of the tape; and based upon a detection of a loss of power, applying the set brake/coast conditions to the supply reel and the take-up reel, wherein the applying of the set brake/coast conditions to the supply reel and the take-up reel comprises applying brake to the supply reel and applying brake to the take-up reel, in response to identifying the tape is moving in a forward direction and identifying the position of the tape being in a range greater than 50% in the take-up reel.

14. The computer program product of claim 13, wherein the applying of the set brake/coast conditions to the supply reel and the take-up reel comprises applying brake to the supply reel and applying coast to the take-up reel, in response to identifying the tape is moving in the forward direction and identifying the position of the tape being in a range of 0 through 50% in the take-up reel.

15. The computer program product of claim 13, wherein the applying of the set brake/coast conditions to the supply reel and the take-up reel comprises applying coast to the supply reel and applying brake to the take-up reel, in response to identifying the tape is moving in a reverse direction and identifying the position of the tape being in a range of 0 through 50% in the supply reel.

16. The computer program product of claim 13, wherein the applying of the set brake/coast conditions to the supply reel and the take-up reel comprises applying brake to the supply reel and applying brake to the take-up reel, in response to identifying the tape is moving in a reverse direction and identifying the position of the tape being in a range greater than 50% in the supply reel.

17. The computer program product of claim 13, wherein the brake/coast conditions are set dynamically based on both the direction in which the tape is moving, and the position of the tape being identified dynamically during operation of the tape storage device.

* * * * *